United States Patent [19]

Tigliev et al.

[11] Patent Number: 5,896,223

[45] Date of Patent: Apr. 20, 1999

[54] OPTICAL SYSTEM HAVING AN UNLIMITED DEPTH OF FOCUS

[76] Inventors: George S. Tigliev, Rouse 55, Apt. 190, 191104, St. Petersburg, Russian Federation; Frank S. Letcher, 3416 S. Florence Ave., Tulsa, Okla. 74105

[21] Appl. No.: 08/876,088

[22] Filed: Jun. 13, 1997

[51] Int. Cl.⁶ .................................................. G02B 21/06
[52] U.S. Cl. ...................... 359/388; 359/368; 359/385
[58] Field of Search ................................ 359/227-229, 359/368-390, 738-740, 642, 694-706; 396/72-90, 95, 133, 235-240, 129, 503

[56] References Cited

U.S. PATENT DOCUMENTS

| | | | |
|---|---|---|---|
| 4,448,498 | 5/1984 | Muller et al. | 359/377 |
| 4,863,252 | 9/1989 | McCarthy et al. | 359/376 |
| 5,054,896 | 10/1991 | Margolis | 359/379 |
| 5,299,053 | 3/1994 | Kleinburg et al. | 359/227 |
| 5,321,447 | 6/1994 | Sander et al. | 359/376 |
| 5,351,152 | 9/1994 | Kuo et al. | 359/376 |
| 5,446,583 | 8/1995 | Evatt, Jr. | 359/227 |
| 5,448,399 | 9/1995 | Park et al. | 359/368 |
| 5,517,353 | 5/1996 | Ikoh et al. | 359/368 |
| 5,557,454 | 9/1996 | Takahashi | 359/376 |

*Primary Examiner*—Thong Nguyen

[57] ABSTRACT

An optical system for use in a microscope and other optical systems has an unlimited depth of focus. The optical system comprises a lens set comprising a first optical element and a second optical element; mechanisms for continuously oscillating the focal length of the lens set in stepwise increments; and mechanisms for permitting light to pass through the lens set when the focal length is momentarily fixed and for preventing light to pass through the lens set when the focal length is not momentarily fixed. The rapid (i.e., greater than about 16 images a second) and sequential replacement of images in a plane parallel to and at a fixed distance will provide an unlimited depth of focus to elicit in the observer a sense of sharp focus of the entire observed object.

23 Claims, 8 Drawing Sheets

OPTICAL SYSTEM HAVING AN UNLIMITED DEPTH OF FOCUS

BACKGROUND OF THE INVENTION

1. Field of the Invention

The present invention relates to optical systems and, more particularly, to optical systems that have an unlimited depth of focus.

2. Description of Related Art

A well-known problem encountered with all optical systems is that for any system there is a relatively finite depth of focus, i.e., a fixed range of focus wherein portions of an object or one or more objects are in focus at the same time. A greater depth of focus is desired for presenting to the observer a more complete image of that which is observed. As is well known to those skilled in the art, the depth of focus of a lens system can be increased by increasing the focal length of the lens system and/or using smaller diameter apertures.

In the focus of microscopes, such as used for surgery or biological research, problems arise with using these prior approaches of increasing the depth of focus. In microscopes, there is a practical limit as to the useful length of the lens systems so the focal length is limited. As the magnification increases for a microscope, the depth of focus necessarily decreases, so that with most microscopes the observer is presented with an extremely thin visual image of the observed object that is in focus. When the diameter of the aperture is reduced, this necessarily limits the amount of light that is presented to the observer. To increase the brightness of the visual image, higher intensity lights must be directed at the observed object, either in reflected light systems or for transmitted light systems, which can cause actual harm to the observed object, such as living tissue.

Other methods of increasing the depth of focus of an optical system involve relatively complicated mechanisms to move or rapidly adjust the focus of the optical system, so that the observer is presented with a series of in focus images taken along a plurality of parallel planes passing through the observed object. The trouble with this arrangement is that the depth of focus remains the same, and only the focus is varied manually or by some mechanized means. Some of these prior optical systems are described in U.S. Pat. Nos. 4,448,498; 4,863,252; 5,054,896; 5,321,447; and 5,351,152.

SUMMARY OF THE INVENTION

The present invention has been contemplated to overcome the foregoing deficiencies and meet the above described needs. Specifically, the present invention is a lens system for use in a microscope and other optical systems, and in one preferred embodiment comprises a lens set comprising a first optical element and a second optical element; means for continuously oscillating the focal length of the lens set in stepwise increments; and means for permitting light to pass through the lens set when the focal length is momentarily fixed and for preventing light to pass through the lens set when the focal length is not momentarily fixed. The present invention permits a rapid and sequential presentation to the observer of in-focus images in a plane parallel to and at a fixed distance from the lens system to provide an unlimited depth of focus that elicits in the observer a sense of sharp focus of the entire observed object.

DETAILED DESCRIPTION OF THE PREFERRED EMBODIMENTS

The present invention is a lens system with an unlimited depth of focus, and as such it can be used within almost all forms of optical systems, such as still cameras, movie cameras, television cameras, binoculars, telephoto lenses, cathode ray tubes, image projection systems, and microscopes. For the purposes of the present discussion, the present invention will be referred to as being part of a microscope, and more particularly part of a mono- or bi-ocular microscope as used in surgery.

For the purposes of the present discussion, the term "unlimited depth of focus" means that the depth of focus of a preferred embodiment of the lens system of the present invention is greater than the depth of focus of a substantially identical prior lens system with a fixed depth of focus. Care should be taken to note that "unlimited" does not mean infinite or without end, but it means that it is not normally constrained. As will be described in more detail below, one preferred method for achieving an unlimited depth of focus is by having one or more lens elements move with rapid repetitive advancing movements along the longitudinal optical axis. This repetitive movement with a specific steppage (e.g., distance) and sufficient frequency (e.g., changes of images per second) will elicit in the observer a sense of sharp focus of the observed object. In other words, instead of providing the observer with a single very thin plane of focus (as in prior lens systems), the present invention provides the observer with an in-focus relatively thick stack of planes of focus.

One preferred embodiment of the present invention comprises a lens set, such as an objective lens arrangement in a microscope, that comprises a first optical element and a second optical element. The focal length of the lens set is continuously oscillated in stepwise increments. Light is permitted to pass through the lens set when the focal length is momentarily fixed and light is prevented from passing through the lens set when the focal length is not momentarily fixed. The rapid and sequential replacement of images in a parallel plane and at a fixed distance provide an unlimited depth of focus to elicit in the observer a sense of sharp focus of the observed object.

One of the major principles of the operation of the present invention is the well-known neuro-optical phenomena called "flicker fusion", whereby the eye is presented with a sequential presentation of images to create the illusion of motion. Specifically, the effect of motion is achieved by the rapid sequential changing of frames of a movie film in a plane that is oriented parallel to and at a fixed distance from the object. This effect takes place when the frequency of image change is about 16-24 frames per second or greater. The inventors hereof have adapted this "flicker fusion" principle into a lens system to provide an unlimited depth of focus for a lens system.

Figure 1:
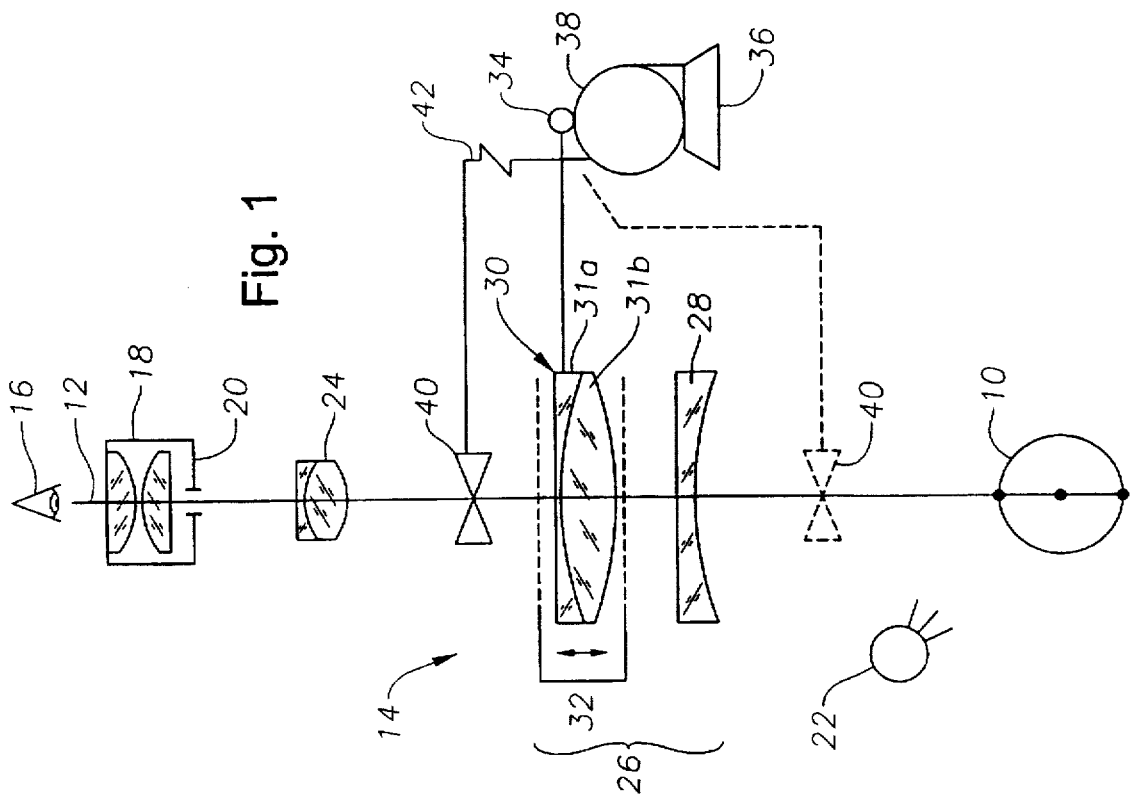
FIG. 1 is a semi-diagrammatic elevational view of one preferred embodiment of a lens system of the present invention.

To aid in the understanding of the present invention, reference is made to the attached drawings. FIG. 1 shows one preferred embodiment of the present invention wherein an object 10 to be observed, such as all or a portion of an anatomical specimen, is located generally within the longitudinal optical axis 12 of a lens system 14 of the present invention. An eye 16 of an observer is shown viewing a magnified optical image of the object 10, in line with the longitudinal optical axis 12, through a magnifying eye piece or ocular 18, having one or more lens elements. The lens system 14 has an adjustable diaphragm 20, within the ocular 18 or adjacent thereto, to adjust the amount of light that passes therethrough. This diaphragm 20 is particularly helpful when viewing a wet or highly reflective object 10 under high intensity light, such as provided by a light source 22. In addition, the smaller the diaphragm opening, the greater the depth of focus of the lens system, as is well known to those skilled in the art.

An intermediate tubular lens 24, comprising one or more optical elements, is spaced from the ocular 18 and lies within the longitudinal optical axis 12. Spaced adjacent the tubular lens 24 is an objective lens 26. The objective lens 26 comprises two or more optical elements. As shown in FIG. 1, a first optical element 28 is fixed relative to the object 10 and a second optical element 30 is capable of being moved along the optical axis 12, i.e., either toward or away from the object 10, to effectively increase or decrease the focal length of the objective lens 26. The second optical element 30 can be formed from one or more individual lenses, such as shown in FIG. 1 by reference numerals 31a and 31b; however, for the purposes of this discussion, the second optical element, regardless of the number of lenses therein, will be referred to simply by the reference numeral 30. It should be understood that the spatial order of the lenses described herein may be changed, as desired, so that, for example, the movable fixed optical element 28 is adjacent the tubular lens 24. In addition, one or more additional optical elements or lenses, such as a lens to invert the image, may be positioned between the tubular lens 24 and the objective lens 26, as well as between the objective lens 26 and the object 10, as is well known to those skilled in the art.

As described previously, the movable optical element 30 is permitted to move a fixed distance, such as 100 mm for a standard surgical microscope, along the longitudinal optical axis 12 without tilting, i.e., the lateral plane through the optical element 30 remaining perpendicular to the optical axis 12. One preferred mechanism to permit this movement is a set of parallel rigid rails or guides 32 on the outer edges of the optical element 30. The guides 32 in turn are mounted to an interior surface of the microscope housing (not shown). An arm 34 extends from the outer edge of the optical element 30 and is in contact with a mechanism for continuously oscillating the optical element 30, to change the focal length of the lens system, in stepwise increments. This mechanism can comprise a stepper motor or other suitable device; however, in one preferred embodiment of the present invention this mechanism comprises an electric motor 36 that turns a multi-lobed cam 38. The rotation of the cam 38 interacts with the arm 34 on the optical element 30 to continuously move the second optical element 30 with respect to the first optical element 28 along the longitudinal optical axis 12 from a first position at a minimum distance from the first optical element 28 to a second position at a maximum distance from the first optical element 28 and back to the first position in discreet fixed-distance increments.

The speed of revolution (rpm) of the motor 36 and the size and configurations of the cam 38 are chosen to cause the optical element 30 to move a fixed distance, such as about 1-2 mm, for each increment and to remain stationary for about 1/1,000 to about 1/500 of a second. The incremental distance of travel is determined by the height and spacing of the lobes on the cam 38, and the total distance of travel is determined by the greatest radial distance of the cam 38. As such, such spacings and sizes, again, are chosen in order to provide the viewer with the greatest clarity of image and depth of focus.

To prevent the observer from seeing an out of focus image as the optical element 30 is being moved, a mechanism is provided for permitting light to pass through the lens system 14 when the focal length is momentarily fixed and for preventing light to pass through the lens system 14 when the focal length is not momentarily fixed. This mechanism comprises a mechanical or electronic shutter 40 that is operatively coupled, either mechanically or electronically via a conduit, wire or mechanical extension 42, to the motor 36 and/or cam 38. The shutter 40 is located anywhere within the lens system 14; however, for size constraints, it is preferred to have the shutter 40 spaced between the tubular lens 24 and the objective lens 26. The shutter 40 is operated in conjunction with the motor 36 and cam 38 to cause a distinct in-focus visual image to be presented to the observer with a frequency of about 16-24 times per second, and preferably faster.

Figure 2:
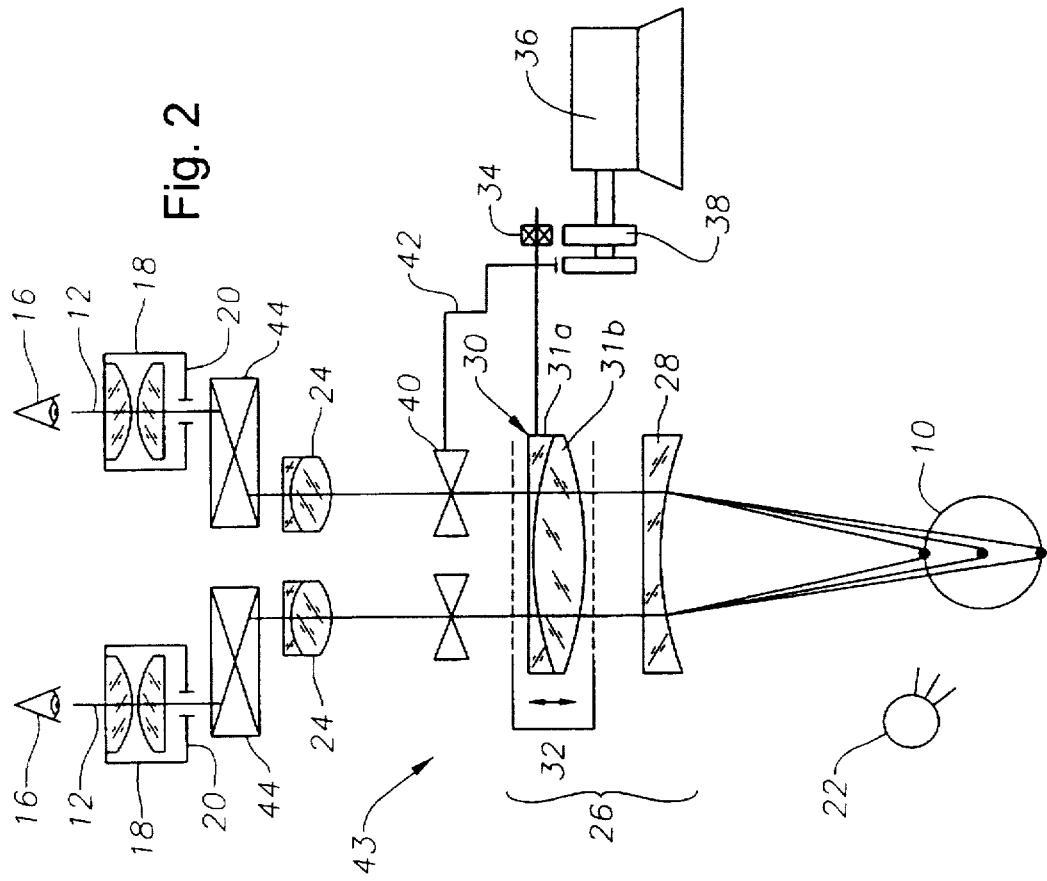
FIG. 2 is a semi-diagrammatic elevational view of an alternate preferred embodiment of the lens system of the present invention, in the form of a dual objective surgical microscope.

FIG. 2 shows a dual lens system of the present invention in the form of a bi-ocular surgical microscope 43. The surgical microscope 43 has dual optical axis 12, and as such has dual oculars 18, diaphragms 20, tubular lenses 24, and shutters 40. As shown by the lines of sight converging upon the object 10, the dual microscope 43 provides the viewer with a stereoscopic view of the object 10. In the embodiment shown in FIG. 2 there is only a single objective lens 26 with a single mechanism for moving the optical element 30, i.e., a single motor 36, arm 34, cam 38, etc. However, if desired, the microscope 43 can have dual objective lenses 26 with appropriate dual mechanisms for moving the optical element 30, as shown in FIG. 1. In addition, for the surgical microscope 43 of FIG. 2 there are inverter lenses, if desired, as well as prisms 44 or other suitable optic devices along each optical axis 12 that allow adjustment in the distance between each optical axis 12 to correspond to the distance between the pupils of the eyes 16 of the viewer.

Now that the general principles of operation of the present invention have been described, more detailed descriptions of the mechanical features of the mechanism for moving the objective lens will be provided. Taken together, FIGS. 3A–3B and FIGS. 4A–4B, illustrate one preferred embodiment of means for continuously oscillating the focal length of a lens set in stepwise increments. A stationary base 46 is mounted within the microscope body (not shown) and has the first optical element 28 fixedly mounted thereto. Extending vertically from the stationary base 46 are one or more vertical rails or guide shafts 48. A mobile carriage 50 rides along the shafts 48, and has mounted thereto the second (movable) optical elements 30 and 31. To ensure that the mobile carriage 50 moves vertically with as little friction as possible, and thereby reduce vibrations and blurring in the optical system, a plurality of roller or ball bearings are housed within the mobile carriage 50 adjacent openings 52 through which the shafts 48 extend. In one preferred embodiment, a plurality of wheels 54 are rotatably mounted on axles 56, and extend into the openings 52 and into contact with the shafts 48. If desired, in place of the wheels 54, one or more cylinders or balls may be used.

An upper end of one or both of the shafts 48 includes a cap 58 that provides an upper stop to prevent the mobile carriage 50 from moving off of the shafts 48. Interposed between the cap 58 and an upper surface of the mobile carriage 50 is one or more springs 60. The arm 34 is rigidly connected to the mobile carriage 50 and extends outwardly therefrom into contact with the cam 38. In the preferred embodiment illustrated, an outer end of the arm 34 does not directly contact the cam 38 but a wheel or roller 62 is rotatably mounted thereto, and the roller 62 rides along the cam 38. The springs 60 gently force the mobile carriage 50 downwardly to keep the arm 34 and/or the roller 62 in contact with the rotating cam 38. In another attempt to reduce vibrations and blurring in the optical system, the cam 38 includes a plurality of balance holes 64 (see FIG. 3A). The holes 64 are strategically placed and sized to ensure that the mass of the multi-lobed cam 38 is evenly radially distributed.

Figure 5:
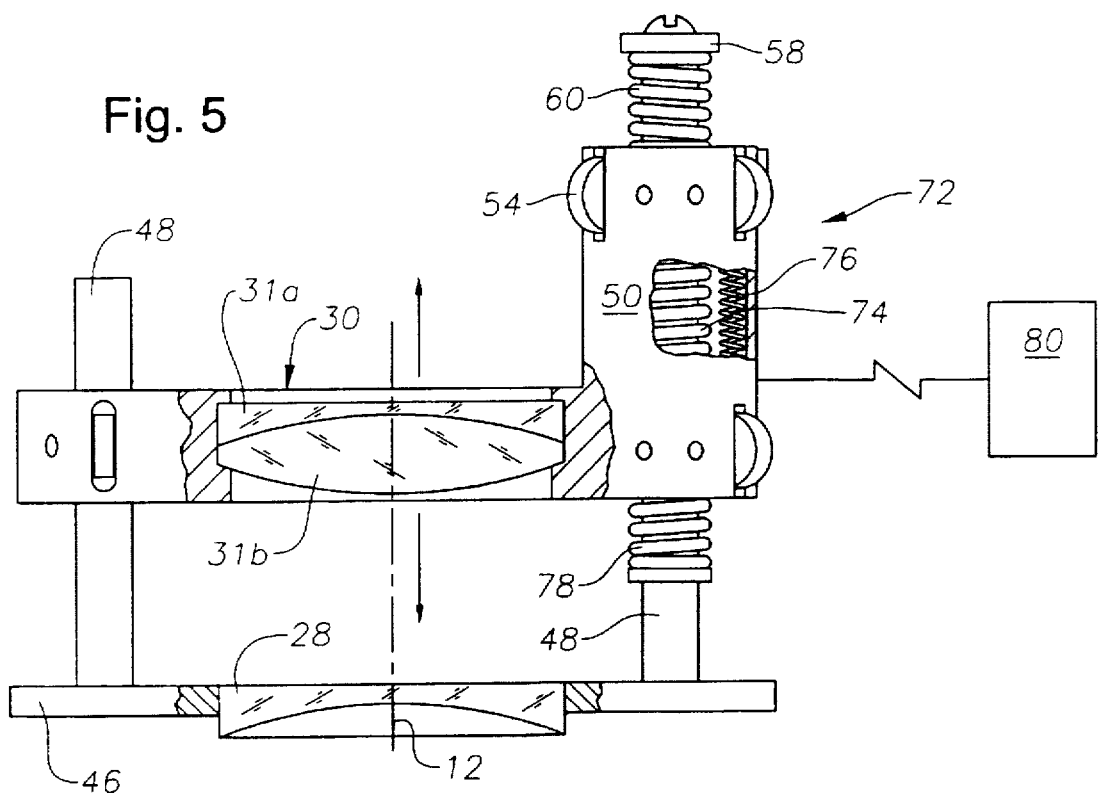
FIG. 5 is a semi-diagrammatic side elevational view of an alternate preferred embodiment of a movable lens mechanism for use in the lens system of the present invention.

In an alternate preferred embodiment, the mobile carriage 50 is moved by means of an electric, electromechanical, hydraulic and/or pneumatic mechanisms. In FIG. 5, the mobile carriage 50 is moved by means of one or more electric solenoids 72. Each solenoid has windings 74 about the shaft 48 and corresponding windings or coils 76 mounted within the carriage 50 adjacent the openings 52. One or more springs 78 are located below the carriage 50 on the shaft 48, and cooperate with spring(s) 60 to gently dampen the movement of the carriage 50, as well as bias it to a center or starting position. Electric circuitry 80 is operatively connected to the windings 74 and 76, as is well known to those skilled in the art, to control the creation of electromagnetic fields to cause the carriage 50, and thus the second optical element 30, to move in discreet stepwise increments.

Figure 3A:
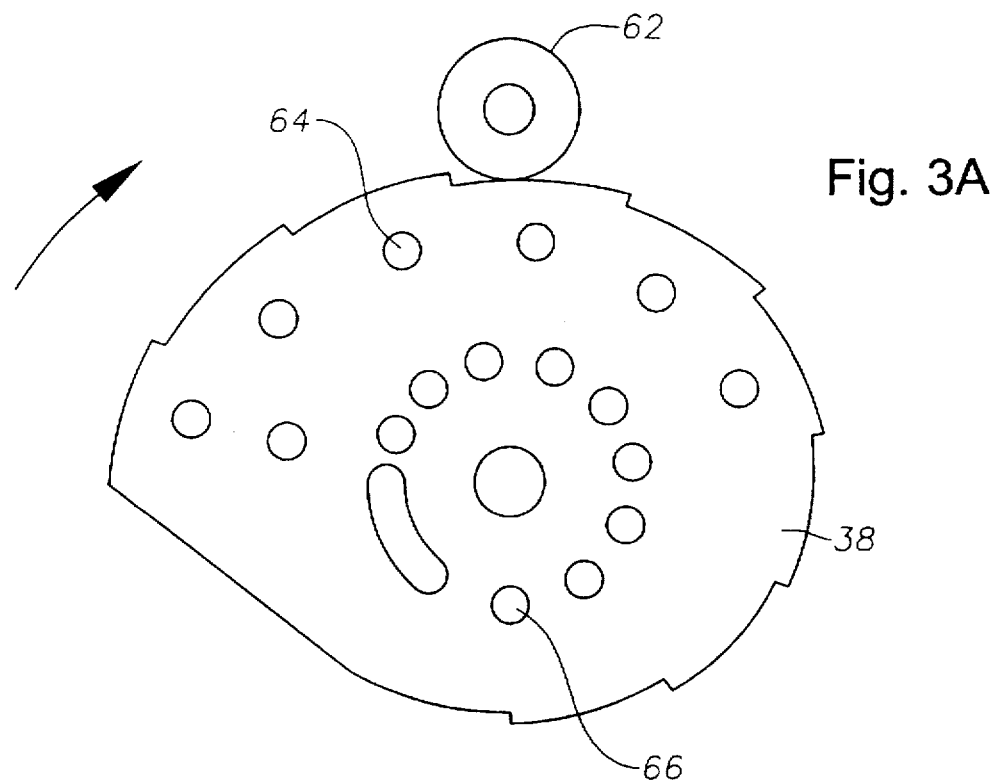
FIGS. 3A and 3B are front and side elevational views, respectively, of one preferred embodiment of a cam mechanism for use in the lens system of the present invention.
Figure 3B:
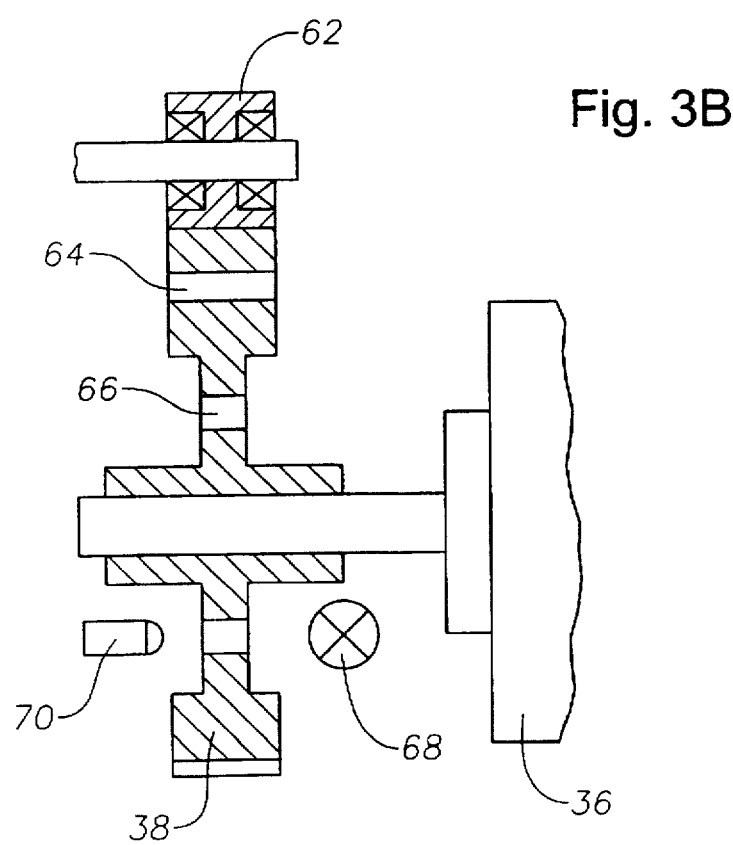
Figure 4A:
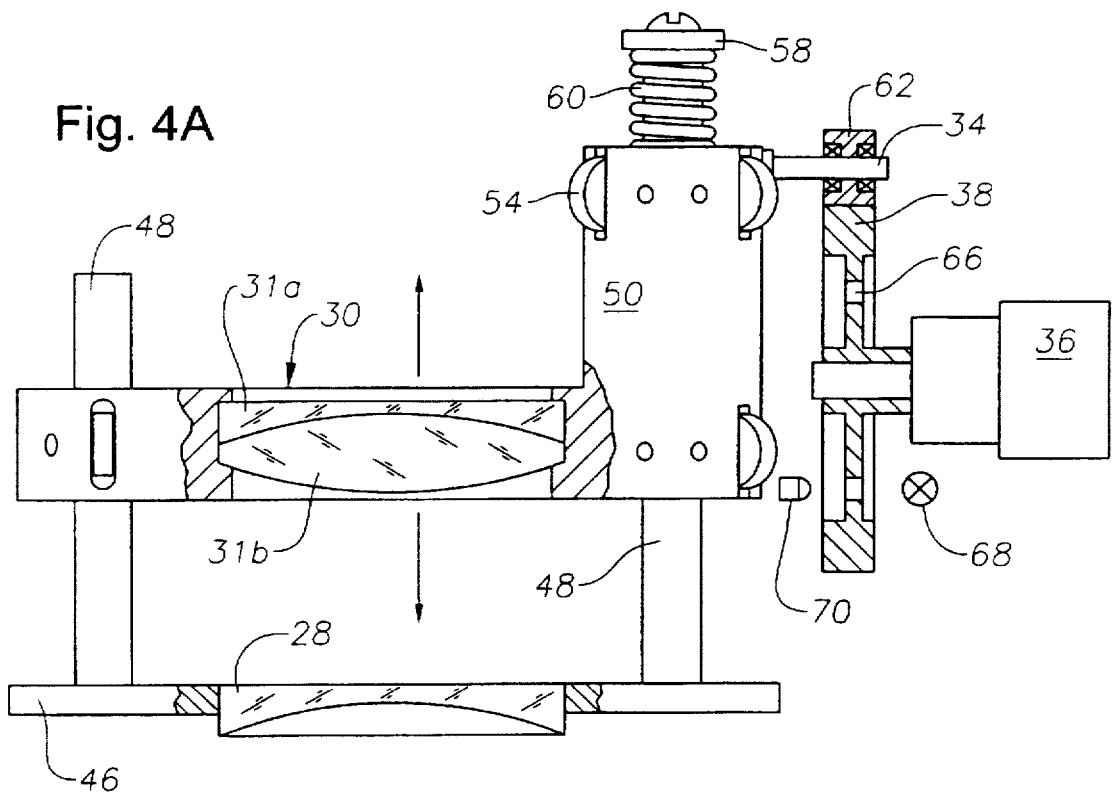
FIGS. 4A and 4B are a side elevational view and a plan view, respectively, of one preferred embodiment of a movable lens mechanism for use in the lens system of the present invention.
Figure 4B:
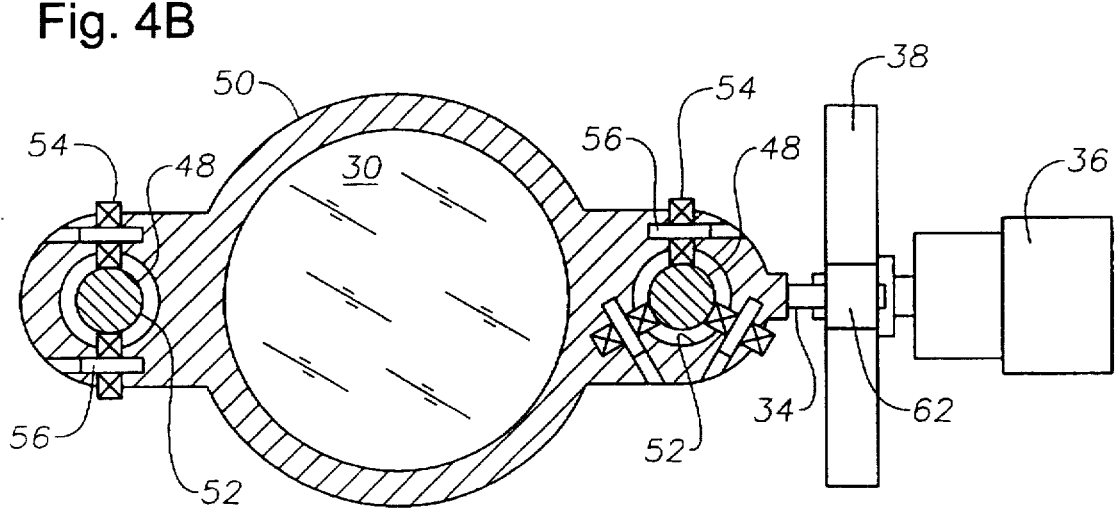

One preferred mechanism to operate the shutter 40 is shown in FIGS. 3B and 4A, and includes one or more holes 66 in the cam 38, as well as a light source 68 and a light detector 70, spaced opposite one another on either side of the cam 38. When the cam 38 rotates, light from the light source 68 will be blocked from being detected by the light detector 70 by the wall of the cam 38. When a hole 66 is moved into line with the light detector 70, an electronic signal from the light detector 70 is passed along the wire 42 to the electronic shutter 40. The shutter 40 then will either open or close, depending upon how the circuitry is established. The spacing, size and configuration of the holes 66 are chosen to operate the shutter 40 in a manner that will maximize the clarity of the image presented to the viewer.

The shutter 40 can be any suitable device that discretely permits the passage of light and then prevents the passage of light. As such, the shutter 40 need not be limited to a mechanical or electric shutter, but can use LCD's or other crystal structures or laminates that transform themselves from transparent to opaque upon the application of an electrical charge or other transforming catalyst, such as the addition of or change of temperature, fluid pressure, sound waves, stress, strain, or chemical interaction.

Figure 6:
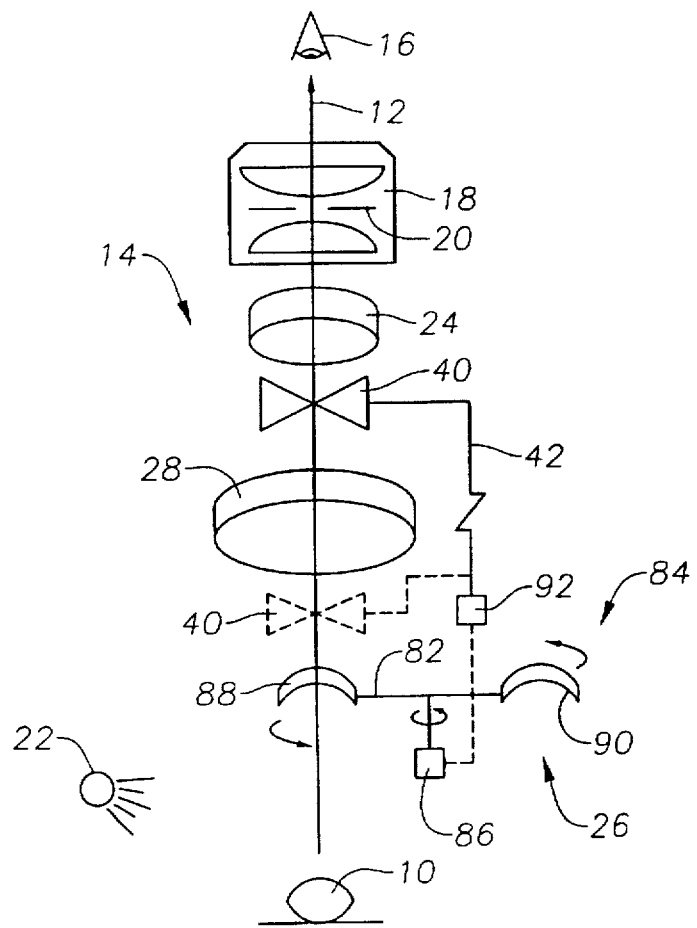
FIG. 6 is a semi-diagrammatic elevational view of an alternate preferred embodiment of a lens system of the present invention, with a rotatable carriage of lenses.

The previous discussions have focused mainly on the movement of the second optical element 30 along the optical axis 12; however, the principle of operation of the present invention can also be applied to the movement of the entire objective lens 26 or just to the second optical element 30 in a direction that is not along the optical axis 12, e.g., vertically. For example, in FIG. 6, a disc or wheel-like carriage 82 has at least two lens sets 84 mounted thereto. Each lens set 84 can comprise an entire objective lens 26 (made from a plurality of optical elements) or the second optical element 30, as is desired. Each lens set 84 has a different optical characteristic, such as thickness, curvature, or density. A rotary drive mechanism 86 is operatively connected to the carriage 82, and causes the carriage 82 to rotate about a longitudinal axis that is parallel to the optical axis 12, in step wise increments to momentarily center and fix a first lens set 88 and then a second lens set 90 in the optical axis 12. The drive mechanism 86 can be electric, electromechanical, hydraulic and/or pneumatic, and is preferably an electric motor, such as a stepper motor, which is well known to those skilled in the art. Once the carriage 82 has momentarily stopped with a lens within the optical axis 12, control circuitry 92, in communication with the drive mechanism 86 and the shutter 40, causes the shutter 40 to permit light to pass therethrough. Thereafter, the shutter 40 prevents light to pass therethrough, and the drive mechanism 86 is activated to move the carriage 82 and center another lens set 88 or 90 within the optical axis 12.

Figure 7:
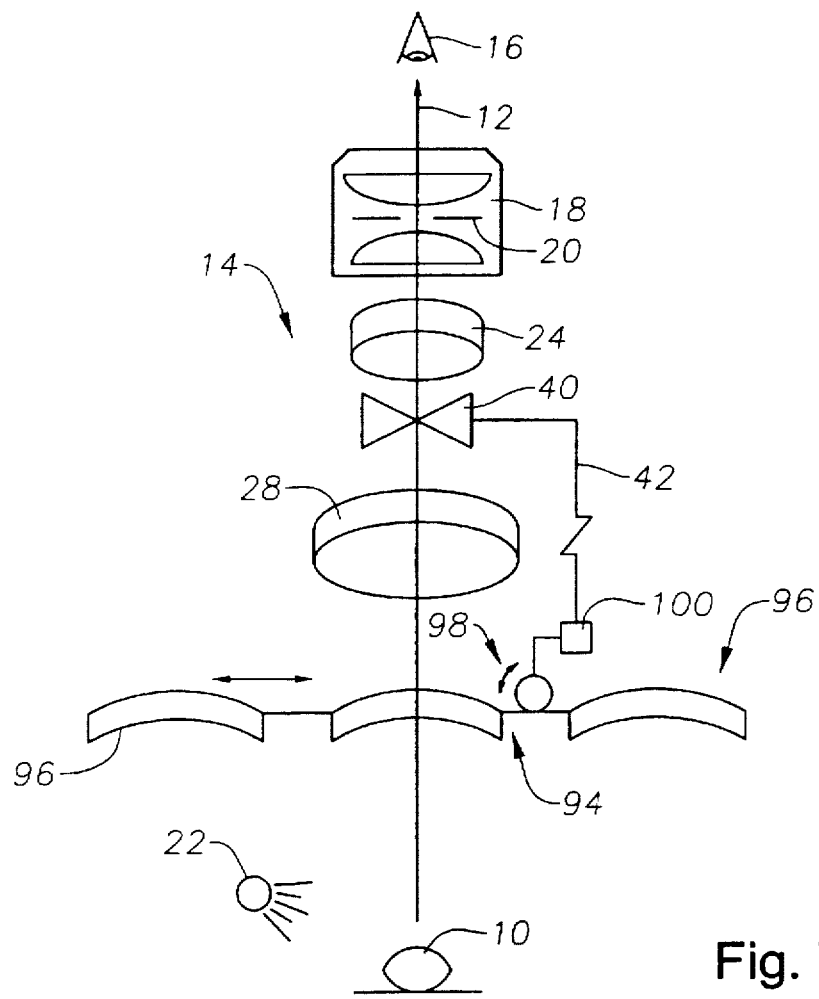
FIG. 7 is a semi-diagrammatic elevational view of an alternate preferred embodiment of a lens system of the present invention, with a sliding carriage of lenses.

In like manner, another alternate preferred embodiment of the present invention is shown in FIG. 7 wherein a linear array of lenses are mounted to a generally flat carriage 94, which has at least two lens sets 96 mounted thereto. Each lens set 96 can comprise an entire objective lens 26 or the second optical element 30, as is desired. Each lens set 96 has differing optical characteristics, such as thickness, curvature, or density. A linear drive mechanism 98 is operatively connected to the carriage 94, and causes the carriage 94 to move laterally in a plane perpendicular to the optical axis 12 in step wise increments to momentarily center each of the plurality of the lens sets 96 in the optical axis 12. The drive mechanism 98 can be electric, electromechanical, hydraulic and/or pneumatic, and is preferably an electric solenoid or an electric motor, such as a stepper motor, which is well known to those skilled in the art. Once the carriage 94 has momentarily stopped, control circuitry 100, in communication with the drive mechanism 98 and the shutter 40, causes the shutter 40 to permit light to pass therethrough. Thereafter, the shutter 40 prevents light to pass therethrough, and the drive mechanism 98 is activated to move the carriage 94 and center another lens set 96 within the optical axis 12.

Figure 8:
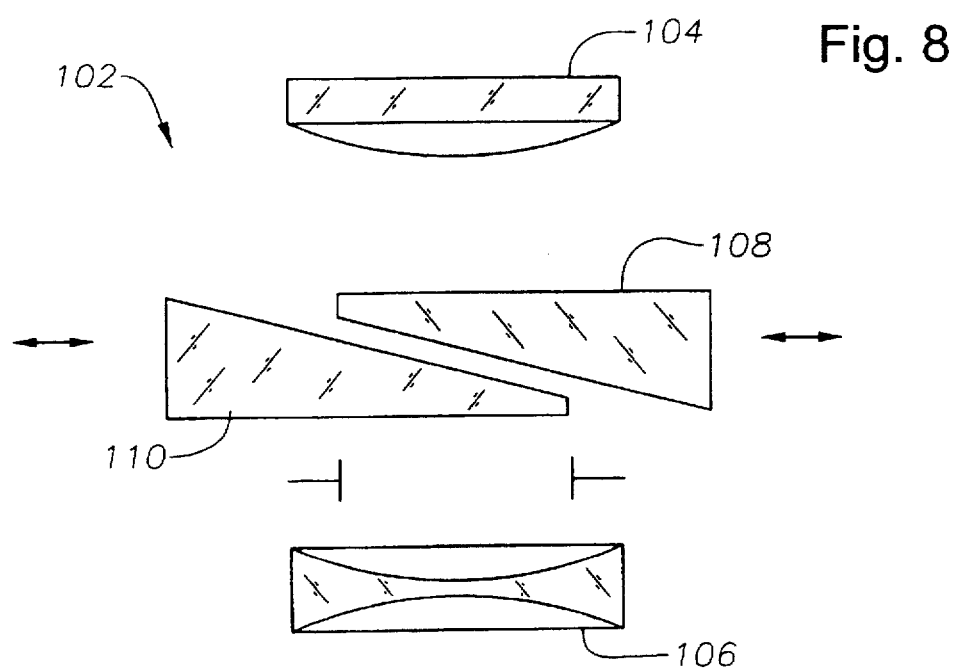
FIG. 8 is a semi-diagrammatic elevational view of an alternate preferred embodiment of an objective lens for use within a lens system of the present invention.

Keeping with the concept of laterally moving the lens rather than vertically moving the lens, another preferred embodiment of the present invention is shown in FIG. 8. In this preferred embodiment, an objective lens 102 comprises one or more fixed optical elements 104 and 106, with two movable lens elements 108 and 110 spaced therebetween. As shown, the lens elements 108 and 110 are wedge shaped and are cooperatively aligned so that lateral (i.e., side-to-side) movement of one or both of the lenses 108 and 110 in a plane perpendicular to the optical axis 12 will change the focal length of the objective lens 102. The lenses 108 and 110 preferably have the same optical characteristics, but may have differing optical characteristics, such as thickness, curvature, or density. A drive mechanism (not shown) is operatively connected to one or both of the lenses 108 and 110 to move one or both of the lenses. As with the previously described lens systems, the drive mechanism can be electric, electromechanical, hydraulic and/or pneumatic, and is preferably an electric solenoid or an electric motor, such as a stepper motor, which is well known to those skilled in the art. As before, when the lenses 108 and 110 have momentarily stopped, control circuitry, in communication with the drive mechanism and the shutter, causes the shutter to permit light to pass therethrough. Thereafter, the shutter prevents light to pass therethrough, and the drive mechanism is activated to move the lenses 108 and 110.

Figure 9A:
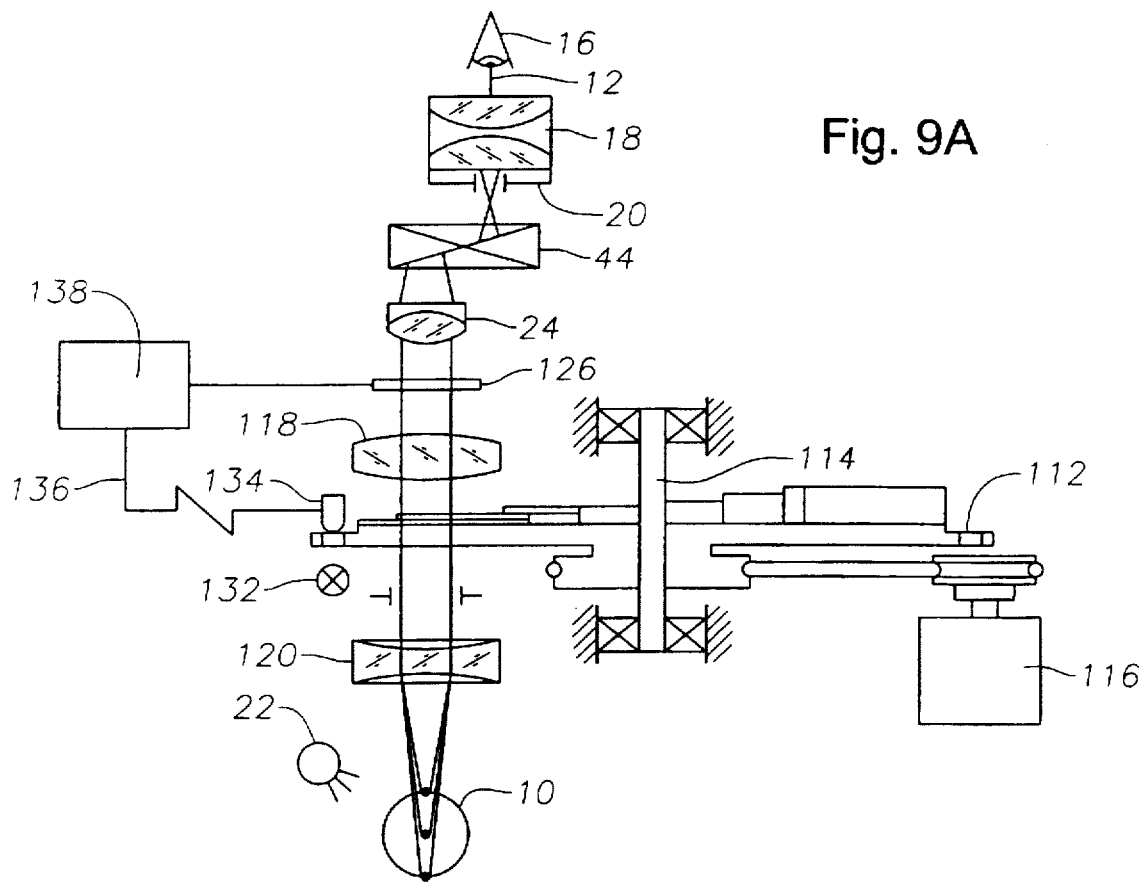
FIG. 9A is a semi-diagrammatic elevational view of an alternate preferred embodiment of a lens system of the present invention, with a rotating carriage of lens elements.
Figure 9B:
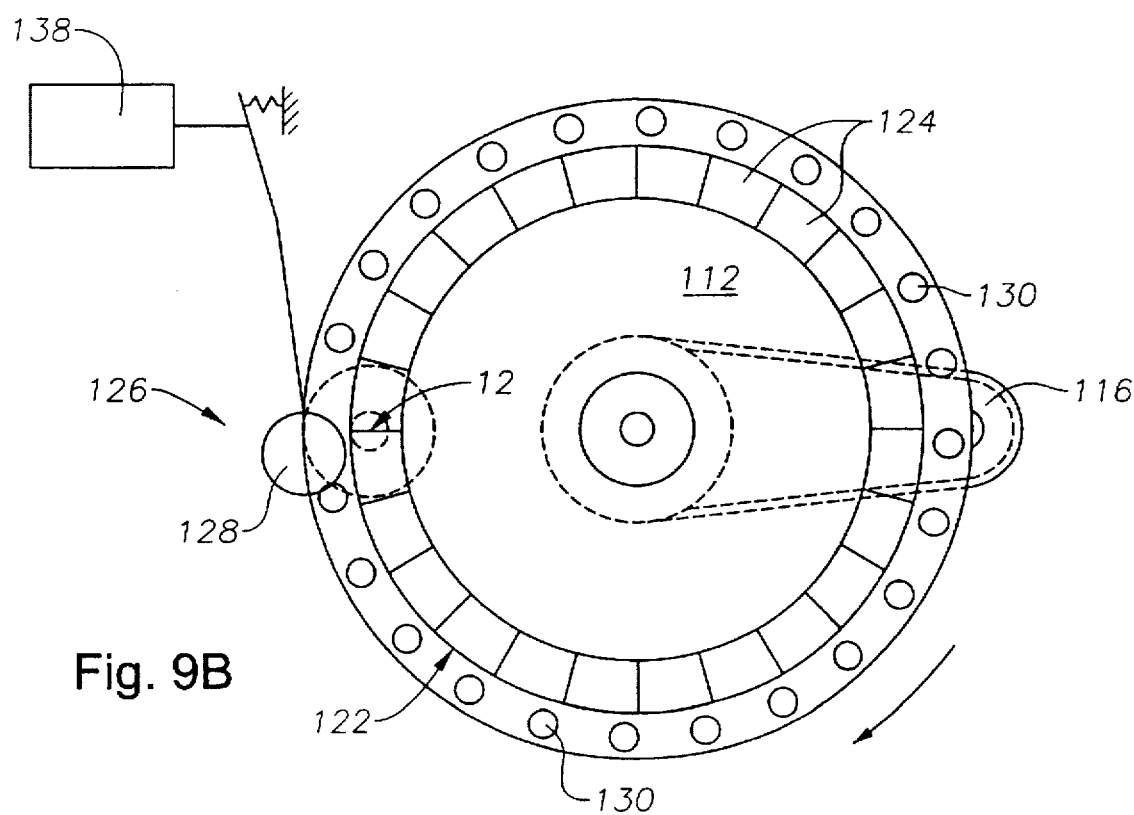
FIG. 9B is a plan view of the lens system of FIG. 9A.
Figure 10A:
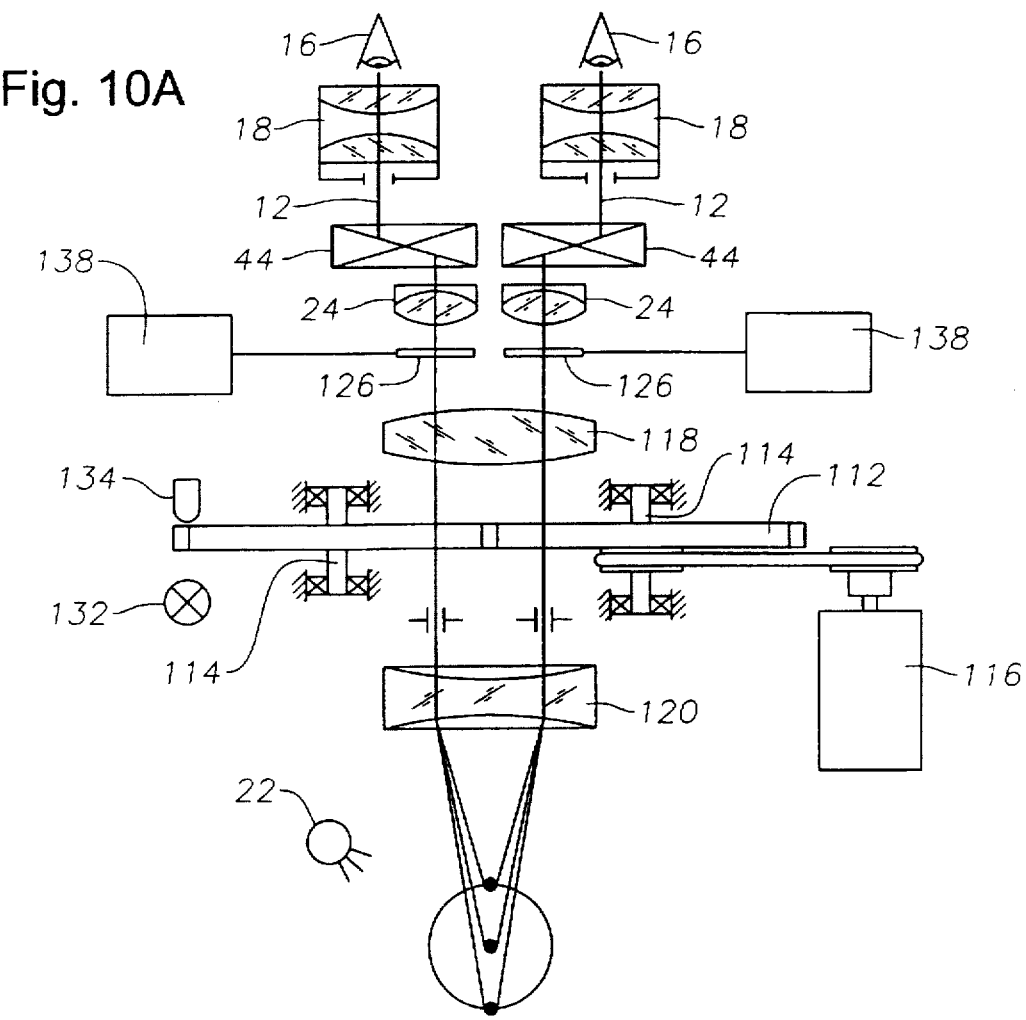
FIG. 10A is a semi-diagrammatic elevational view of an alternate preferred embodiment of a lens system of the present invention, with dual rotating carriages of lens elements.
Figure 10B:
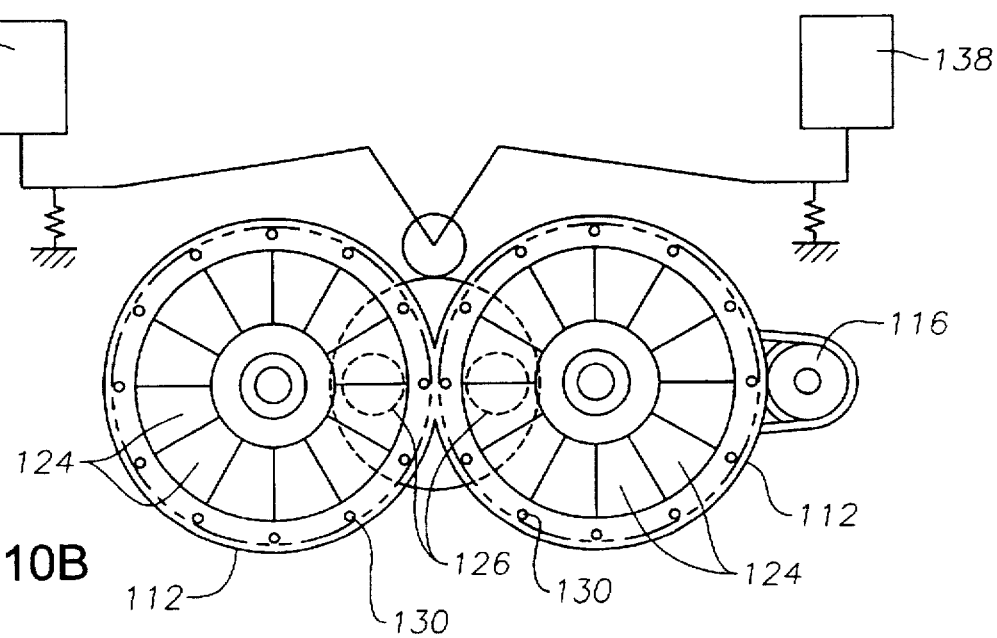
FIG. 10B is a plan view of the lens system of FIG. 10A.

In the previous preferred embodiments, the objective lens systems employed one or more lenses that moved, stopped and then moved again. In most circumstances any vibrations resulting from this stepwise movement of the lenses is acceptable; however, this may not be the case in the instances where very high powers of magnification are needed. Therefore, the inventors hereof have developed a variation on the concepts presented previously that employ continuously and smoothly moving lenses. FIGS. 9A and 9B show a mono lens system and FIGS. 10A and 10B show a bi-ocular lens system that employs this continuous and smooth movement of lenses to provide the observer with the desired unlimited depth of focus.

More specifically, in FIGS. 9A and 9B a circular carriage 112 is continuously and smoothly rotated about a vertical axle 114 by a belt and motor mechanism 116. The carriage 112 rotates about a vertical axis that is parallel to the optical axis 12. An outer radius portion of the carriage 112 rotates through the optical axis 12 between one or more lens fixed elements 118 and 120. This outer radius portion of the carriage 112 includes a ring 122 of a plurality of lens elements 124. Each lens element 124 has essentially the same (constant) optical characteristics across its dimensions, yet each lens element 124 has a different optical characteristic from the immediately adjacent lens element 124. The optical characteristics of the lens elements 124 vary by having differences in density, shape, thickness, and/or curvature. The ring 122 has the lens elements 124 arranged in a pattern so that as each lens element 124 is rotated through the optical axis 12 a sequence of images is presented to the observer 16. For example, the ring 122 in FIG. 9B has 24 individual lens elements 124, and the pattern of optical characteristics to vary sequentially, such as elements #1, 2, 3, . . . .23, 24. Or, the lens elements 124 can vary in a repeating pattern, such as elements #1, 2, 3, 4, 3, 2, 1, 2, 3, . . . , or #1, 2, 3,4, . . . . 11, 12, 1,2, 3,4, . . . . 11, 12.

It should be noted that since each lens element 124 has essentially the same (constant) optical characteristics across its dimensions, that as each lens element 124 is rotated through the optical axis 12, the image presented to the observer 16 will remain essentially the same during that time period, even though the lens element 124 is continuously moving. To provide the observer with the desired unlimited depth of focus through the rapid and sequential replacement of differing visual images, a shutter is needed to block the image when there is a transition from one image to the next. In other words, when the trailing edge of a lens element 124 comes to the optical axis 12, there should be a blockage of an image until the leading edge of the next lens element 124 passes past the optical axis 12. As shown in FIGS. 9A and 9B, a shutter 126 is placed within the optical axis 12, and comprises any suitable device that discretely permits the passage of light and then prevents the passage of light. As such, the shutter 126 can be any commercially available mechanical or electric shutter, but can use LCD's or other crystal structures or laminates that transform themselves from transparent to opaque upon the application of an electrical charge or other transforming catalyst, such as the addition of or change of temperature, fluid pressure, sound waves, stress, strain, or chemical interaction. An alternate embodiment of the shutter 126 is to have a disc 128 that moves back and forth across the optical axis 12 in a controlled manner described below.

One preferred mechanism to operate the shutter 126 includes a plurality of holes 130 in the carriage 112, as well as a light source 132 and a light detector 134, spaced opposite one another on either side of the carriage 112. When the carriage 112 rotates, light from the light source 132 will be blocked from being detected by the light detector 134 by the rim of the carriage 112. When a hole 130 is moved into line with the light detector 134, an electronic signal from the light detector 134 is passed along a wire 136 to a shutter controller 138. The shutter 126 then moves or either open or close, depending upon how the circuitry is established. The spacing, size and configuration of the holes 130 are chosen to operate the shutter 126 in a manner that will maximize the clarity of the image presented to the viewer.

The embodiments of FIGS. 9A, 9B, 10A, and 10B have at least two advantages over the previously described systems, especially when used in relatively high magnification systems. First, is the reduction in vibration caused by the elimination of the incremental movement of the lenses. Second, is the ability to provide a brighter image to the viewer. The brighter image is a result of the shutter 126 being open a majority of the time, and closed for only a relatively short period of time when the edge of a lens element 124 is passing through the optical axis 12. Therefore, far more light is passed through the lens system to the viewer.

Figure 11:
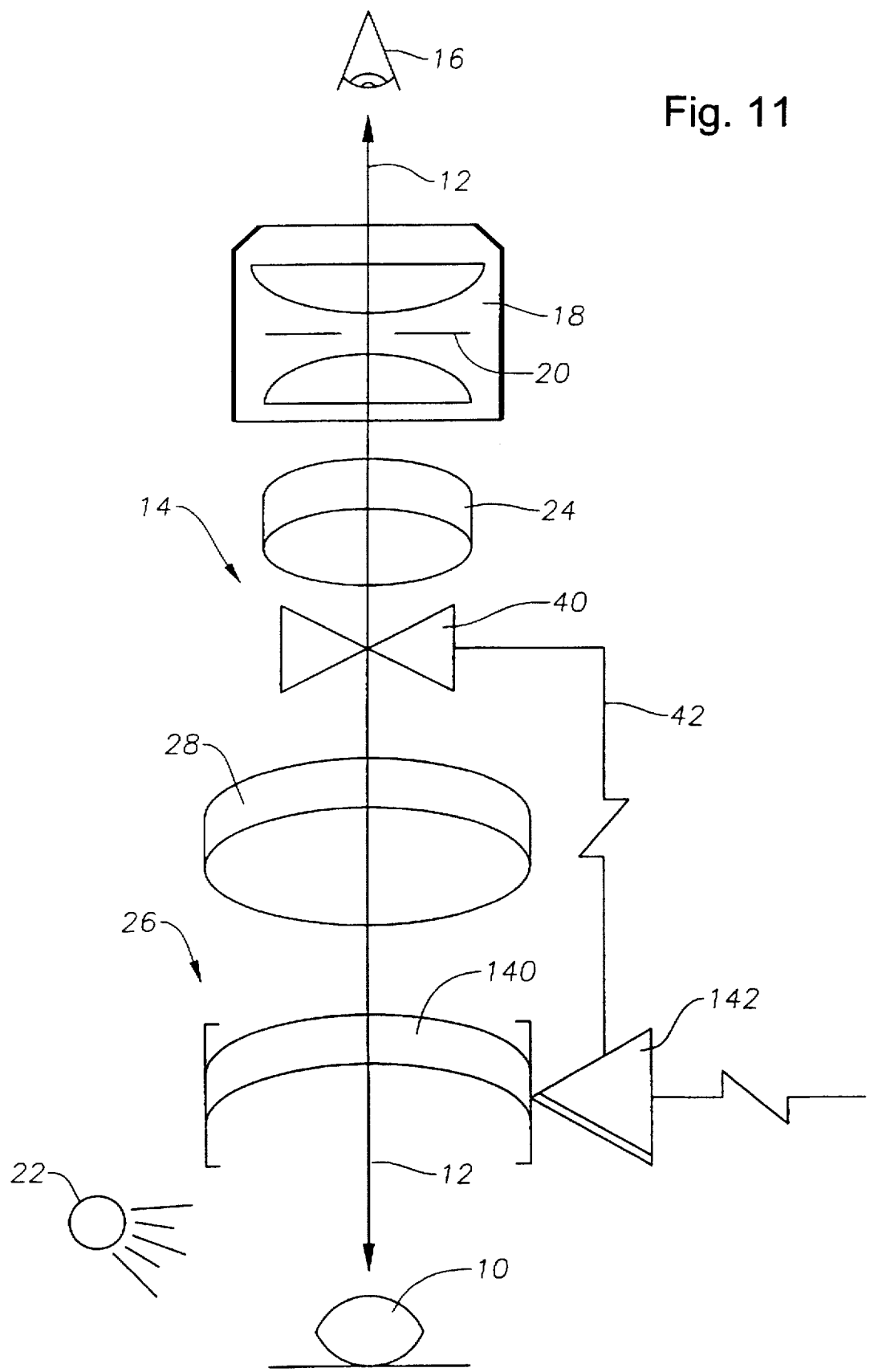
FIG. 11 is a semi-diagrammatic elevational view of an alternate preferred embodiment of a lens system of the present invention, with an objective lens that can have its optical characteristics changed.

The inventors hereof have found that the principle of "unlimited depth of focus" can be used in any device or system where lenses are used. Yet, conventional lens structures need not be used. The principle can be adapted for use with lenses formed from one or more crystals, crystal laminates, plastic or ceramic laminates, gels, gasses, and liquids. In addition, actual physical movement of one or more of the lenses need not occur to change the focal length in the manner contemplated herein. In one preferred embodiment shown in FIG. 11, one or more lenses 140 do not physically move with respect to the object 10, but have their optical characteristics continuously and discreetly changed. In FIG. 11, the lens 140 is a crystalline structure that has its optical density, thickness and/or shape changed under control of a suitable control system 142, which in turn is operatively connected to the shutter 40. The lens 140 can be changed to provide the desired unlimited depth of focus by applied changes in electrical voltage, amperage, or frequency, amplitude and frequency of vibrations or sound energy, changes in temperature, changes in fluid pressure, changes in applied force, such as stress or strain, or chemical interaction.

As has been described above, with the present invention light is permitted to pass through the lens system when the lenses, and therefore the focal length of the lens system, are momentarily fixed and light is prevented from passing through the lens set when the focal length is not momentarily fixed. The rapid and sequential replacement of differing visual images presented to an observer in a parallel plane and at a fixed distance provide an unlimited, i.e., far greater than previously obtainable with a comparable prior lens system, depth of focus to elicit in the observer a sense of sharp focus of the observed object.

Whereas the present invention has been described in relation to the drawings attached hereto, it should be understood that other and further modifications, apart from those shown or suggested herein, may be made within the scope and spirit of the present invention.

What is claimed is:

1. An optical system having unlimited depth of focus, comprising:
    at least one lens;
    means for continuously oscillating the focal length of the lens in stepwise increments; and
    means for permitting light to pass through the lens when the focal length is momentarily fixed and for preventing light to pass through the lens when the focal length is not momentarily fixed.

2. An optical system of claim 1 wherein the at least one lens further comprises a first optical element and a second optical element, and wherein the means for oscillating further comprises a motor means for moving the second optical element with respect to the first optical element along a longitudinal optical axis of the lens.

3. An optical system of claim 2 wherein the motor means continuously moves the second optical element from a first position at a minimum distance from the first optical element to a second position at a maximum distance from the first optical element and back to the first position in discreet fixed-distance increments.

4. An optical system of claim 1 wherein the at least one lens further comprises a first optical element and a second optical element, and wherein the means for oscillating further comprises a solenoid means for moving the second optical element with respect to the first optical element along a longitudinal optical axis of the lens.

5. An optical system of claim 4 wherein the solenoid means continuously moves the second optical element from a first position at a minimum distance from the first optical element to a second position at a maximum distance from the first optical element and back to the first position in discreet fixed-distance increments.

6. An optical system of claim 1 wherein the means for oscillating further comprises means to change the optical density of the at least one lens.

7. An optical system of claim 1 wherein the means for oscillating further comprises means to alter the shape of the at least one lens.

8. An optical system having unlimited depth of focus, comprising:
    a lens set comprising a first optical element and a second optical element;
    means for continuously moving the second optical element with respect to the first optical element along a longitudinal optical axis of the lens set from a first position at a minimum distance from the first optical element to a second position at a maximum distance from the first optical element and back to the first position in discreet fixed-distance increments; and
    shutter means for permitting light to pass through the lens set when the second optical element is momentarily fixed in position and for preventing light to pass through the lens set when the second optical element is not momentarily fixed in position.

9. An optical system of claim 8 wherein the second optical element is carried upon a mobile carriage, which is in operative contact with the means for continuous movement.

10. An optical system of claim 8 wherein the means for continuous movement further comprises an electric motor, a multi-lobed cam connected to an output shaft of the electric motor, and an arm that contacts a radial surface of the cam, the arm rigidly connected to a carrier of the second optical element.

11. An optical system of claim 8 and further comprising a stationary base having the first optical element rigidly mounted thereto; at least one guide shaft extending from the stationary base; a mobile carriage movable along the at least one guide shaft, with the second optical element mounted thereto; an electric motor; a multi-lobed cam connected to an output shaft of the electric motor; and an arm that contacts and rides along a radial surface of the cam, the arm rigidly connected to the mobile carriage.

12. An optical system of claim 8 wherein the means for continuous movement further comprises an electric solenoid.

13. An optical system of claim 8 wherein the shutter means further comprises an electric shutter operatively connected to an electronic mechanism that is operated by the means for continuous movement.

14. An optical system having unlimited depth of focus, comprising:
    a plurality of lens sets, each comprising at least one optical element, and each having a different optical characteristic;
    means for continuously and sequentially moving the lens sets into line with a longitudinal optical axis of a lens system; and
    shutter means for permitting light to pass through the lens system to a viewer when each of the lens sets is momentarily fixed in position and for preventing light to pass to the viewer when one of the lens sets is not momentarily fixed in position.

15. An optical system of claim 14 wherein the plurality of lens sets are carried upon a carriage that rotates about a longitudinal axis parallel to the optical axis.

16. An optical system of claim 14 wherein the plurality of lens sets are carried upon a linear carriage that moves along a plane perpendicular to the optical axis.

17. A method of providing an optical system with an unlimited depth of focus, comprising the step of:
    (a) continuously oscillating the focal length of at least one lens in stepwise increments; and
    (b) permitting light to pass through the lens when the focal length is momentarily fixed and preventing light to pass through the lens when the focal length is not momentarily fixed.

18. A method of claim 17 wherein the step of oscillating the focal length comprises moving a first lens with respect to a second lens.

19. A method of claim 17 wherein the step of oscillating the focal length comprises changing the optical density of the lens.

20. A method of claim 17 wherein the step of oscillating the focal length comprises changing the shape of the lens.

21. A method of providing an optical system with an unlimited depth of focus, comprising the step of:

(a) continuously moving a second optical element with respect to a first optical element along a longitudinal optical axis from a first position at a minimum distance from the first optical element to a second position at a maximum distance from the first optical element and back to the first position in discreet fixed-distance increments; and (b) permitting light to pass through the second optical element when the second optical element is momentarily fixed in position and preventing light to pass therethrough when the second optical element is not momentarily fixed in position.

22. An optical system having unlimited depth of focus, comprising:

a lens set comprising a plurality of optical elements each having a different optical characteristic;

means for continuously rotating the optical elements into line with a longitudinal optical axis of a lens system; and shutter means for preventing light to pass to a viewer during an image transition.

23. An optical system of claim 22 wherein the plurality of optical elements are carried upon a carriage that rotates about a longitudinal axis parallel to the optical axis.

* * * * *